(12) United States Patent
Naaktgeboren et al.

(10) Patent No.: US 6,973,779 B2
(45) Date of Patent: Dec. 13, 2005

(54) HYDRAULIC POWER SYSTEM FOR AGRICULTURAL IMPLEMENT INCLUDING FLOW-RATE INDICATOR

(75) Inventors: Adrianus Naaktgeboren, Varsenare (BE); Guy H. J. Osselaere, Loppem (BE)

(73) Assignee: CNH America LLC, New Holland, PA (US)

( * ) Notice: Subject to any disclaimer, the term of this patent is extended or adjusted under 35 U.S.C. 154(b) by 142 days.

(21) Appl. No.: 10/782,484

(22) Filed: Feb. 19, 2004

(65) Prior Publication Data

US 2004/0237767 A1 Dec. 2, 2004

(30) Foreign Application Priority Data

Feb. 19, 2003 (GB) .................................. 0303789

(51) Int. Cl.[7] ............................................ F16D 31/02
(52) U.S. Cl. ........................................ 60/328; 60/445
(58) Field of Search .................... 60/445, 327, 431, 60/328; 91/1, 516, 514

(56) References Cited

U.S. PATENT DOCUMENTS 5,452,579 A * 9/1995 Friedrichsen ................ 60/328
5,493,861 A * 2/1996 Friedrichsen ................ 60/328
5,873,245 A * 2/1999 Kato et al. ................... 60/445
6,295,810 B1 10/2001 Langen et al.

FOREIGN PATENT DOCUMENTS

DE 4120733 A 7/1993

* cited by examiner

Primary Examiner—Edward K. Look
Assistant Examiner—Igor Kershteyn
(74) Attorney, Agent, or Firm—John William Stader

(57) ABSTRACT

An agricultural-implement hydraulic circuit includes a pump supplying pressurized fluid to a first service line and a second service line via a feed line and a device for varying the flow rate of the pump. A distributor valve is disposed between the first service line and the second service line, with the first service line and the second service line being connected and disconnected according to a position of the distributor valve. A hydraulic motor is coupled to the first service line through the valve and discharges fluid to a return line. A hydraulic actuator is coupled to the second service line. An indicator-valve assembly is coupled to the feed line, with the indicator-valve assembly including an indicator sensitive to pressure in the feed line such that the indicator indicates a predetermined pressure in the feed line to an operator.

14 Claims, 2 Drawing Sheets

HYDRAULIC POWER SYSTEM FOR AGRICULTURAL IMPLEMENT INCLUDING FLOW-RATE INDICATOR

BACKGROUND OF THE INVENTION

1. Field of the Invention

The present invention relates to means for providing hydraulic power to an agricultural implement, in particular to a hydraulic power system for an implement including a flow-rate indicator.

2. Description of Background Art

It is well known in the art to provide towed or carried agricultural implements with a hydraulic pump, e.g. a gear pump, for supplying power to one or more hydraulic actuators. Such gear pump can be driven by the Power-Take-Off (PTO) shaft of the agricultural tractor which tows or carries the implement. For each apparatus it is possible to find an appropriate pump which provides the required flow rate and/or pressure. However, the hydraulic pump on each implement adds to the cost thereof.

Meanwhile it is also conventional to equip medium- or top-range tractors with a hydraulic pump for providing auxiliary power to an implement. One or more pairs of standard connectors allow for a direct connection of the implement circuitry to the hydraulic system on the tractor. The operator can control the hydraulic components on the implement through handles and/or knobs inside the tractor cab. The use of such tractor-mounted pumps solves the problem of providing a distinct pump on each implement. The pump on the vehicle may be selected to provide a maximum flow rate suitable for the largest implements. However, such design will result in poor overall efficiency because most implements require a considerably smaller amount of oil and most oil would flow back to the tank via a pressure-relief valve.

It is possible to use a variable-flow-rate pump and to adapt the pump output to the needs of the implement. However, the required minimum flow rate may vary substantially per implement and, frequently, the operator only notices that the flow rate is too low when the implement is not working adequately. When he adapts the flow rate, he may very well exceed the needed minimum value, such that hydraulic power may be lost unnecessarily.

SUMMARY OF THE INVENTION

Hence, there is a need for an apparatus and method that ensures a proper setting of the hydraulic flow rate without excess losses of hydraulic energy. According to a first aspect of the present invention, an agricultural-implement hydraulic circuit includes a pump supplying pressurized fluid to a first service line and a second service line via a feed line and a device for varying the flow rate of the pump. A distributor valve is disposed between the first service line and the second service line, with the first service line and the second service line being connected and disconnected according to a position of the distributor valve. A hydraulic motor is coupled to the first service line through the valve and discharges fluid to a return line. A hydraulic actuator is coupled to the second service line. An indicator-valve assembly is coupled to the feed line, with the indicator-valve assembly including an indicator sensitive to pressure in the feed line such that the indicator indicates a predetermined pressure in the feed line to an operator.

The preferred embodiment ensures that the available flow rate at the inlet of the circuitry is sufficient for the adequate operation of the hydraulic actuators of the implement.

In a preferred embodiment, the circuitry comprises a flow divider having an inlet port connected to the connection means, preferably quick-acting couplings, a first outlet port connected directly or indirectly to an hydraulic actuator and a second outlet port connected to the indicator means. The flow divider may prevent oil flow to the second port as long as a predetermined flow rate, equal to the minimum flow rate for adequate operation, has not been reached. It may also limit the oil flow to the first port to this predetermined flow rate, while deriving the excess oil flow to the second port.

The indicator means may comprise a pressure-sensitive element connected to a by-pass line which is connected to the second outlet port of the divider, the by-pass line being provided with a flow restrictor. The pressure-sensitive element may comprise a spring-loaded piston, which may be provided with a visual indicator, e.g. a colored tab. Alternatively, the piston may be provided with means for generating an electrical signal, e.g. an electrical switch. The implement may then be provided with an electrical connector for transmitting the signal to flow rate control means on the tractor for automatic adjustment of the source of pressurized hydraulic fluid. The flow rate signal may also be converted into a digital message which is sent to the tractor via a serial bus, e.g. a CAN-bus.

A spring-loaded check valve may be arranged in parallel to the flow restrictor for limiting the maximum pressure on the indicator.

Advantageously, the flow divider, flow restrictor and piston may be combined into a single valve assembly.

BRIEF DESCRIPTION OF THE DRAWINGS

The invention will now be described in further detail, by way of example, with reference to the accompanying drawings, in which.

DETAILED DESCRIPTION OF THE PREFERRED EMBODIMENTS

Figure 1:
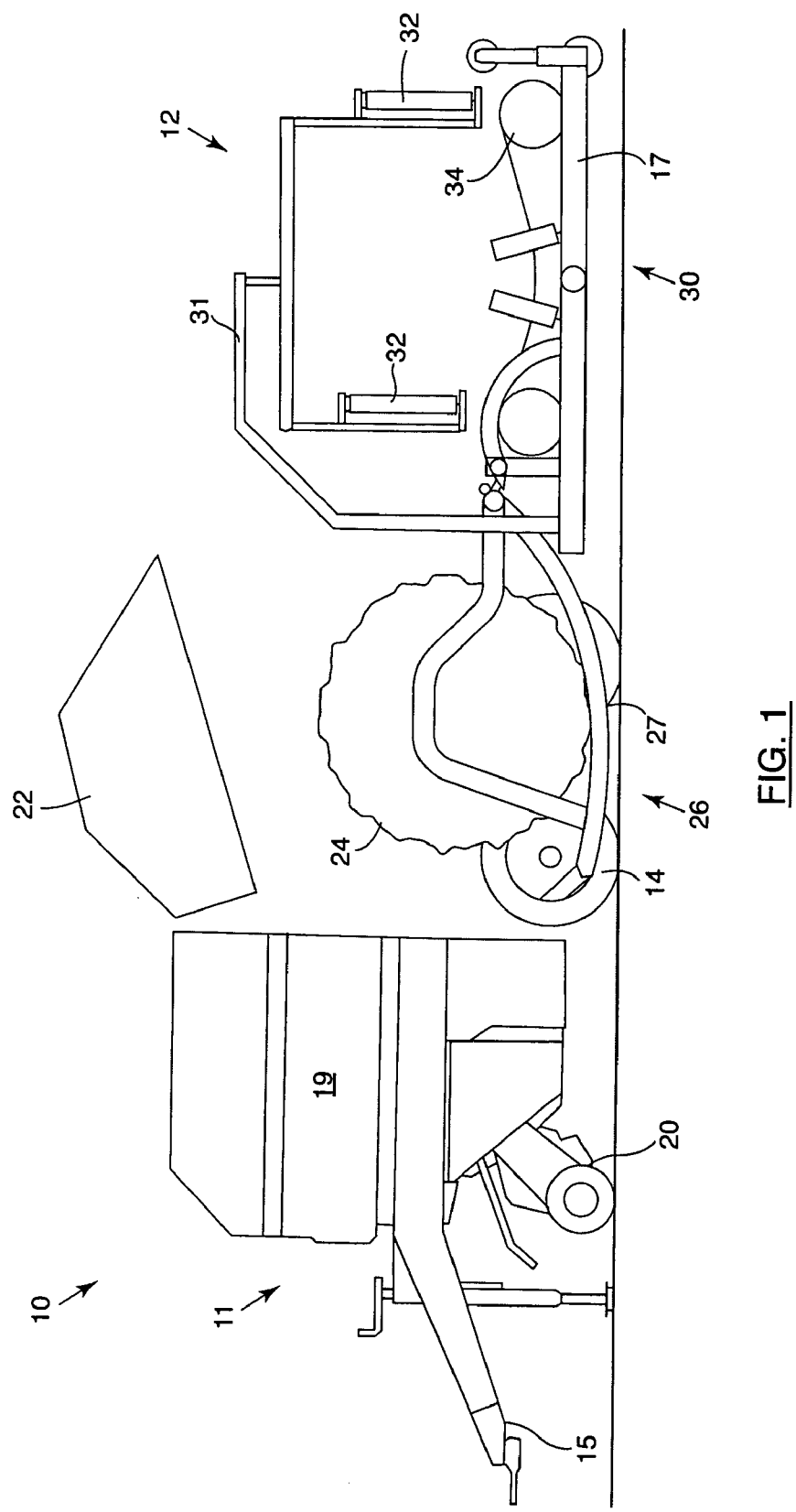
FIG. 1 is a side view of a baler-wrapper combination.

The agricultural implement shown in FIG. 1 is a baler-wrapper combination 10, comprising a round baler 11 for picking up crop material, such as hay or straw, from a field and compressing it into a cylindrical bale, and a bale wrapper 12 for wrapping sheet material, such as plastic film, around the finished bale.

The baler 11 has a support frame provided with a set of wheels 14 and a tow bar 15 for attachment to a tractor or other towing vehicle. The bale wrapper 12 comprises a subframe 17 which is removably attached to and supported by the support frame of the baler. The baler has a baling chamber 19 wherein the crop material lifted up from the field by a pick-up 20, is rotated and compressed by appropriate conveyor means. The conveyor means may comprise transverse rollers and/or juxtaposed belts disposed along the periphery of the baling chamber.

When the material inside the bale chamber 19 has reached its full diameter or its full density, a mechanism (not shown) is operated to tie the crop material into a stable bale.

Thereafter, a tailgate 22 at the rear of the baling chamber is opened and the bale 24 is deposited onto a transfer mechanism 26 of the wrapper 12. This mechanism comprises a fork 27 which receives the bale 24 and tilts rearwardly in order to deposit the bale upon a wrapping table 30.

The bale wrapper 12 comprises a boom 31 which rotatably carries a pair of dispensers 32 which each hold a supply of wrapping material. The wrapping table 30 below the dispensers 32 comprises a conveyor 34 for rotating the bale 24. During the wrapping operation the dispensers 32 are rotated around the bale 24 on the wrapping table, while table conveyor 34 is rotating the bale about its horizontal axis. The sheet of wrapping material is wrapped around the bale until it forms two or more layers around the complete bale surface. Thereafter two knives (not shown) are raised to intercept the wrapping material and then lowered to cut the same and to hold a tail of the wrapping material in a start position until the next wrapping cycle. Meanwhile the wrapping table 30 is tilted rearwardly to deposit the finished bale onto the field.

Figure 2:
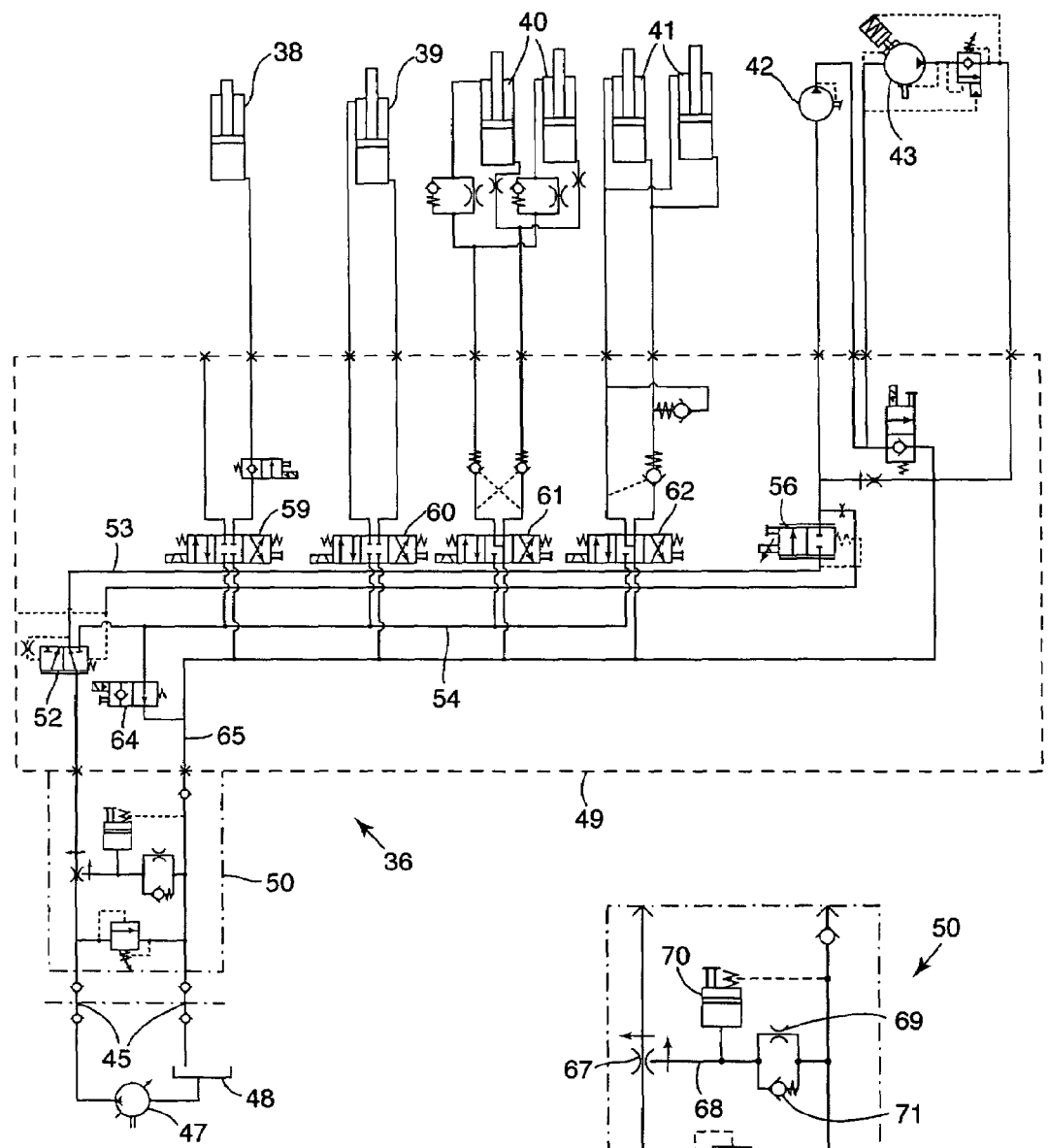
FIG. 2 is a schematic of part of the hydraulic circuitry of the baler-wrapper combination of FIG. 1.
Figure 3:
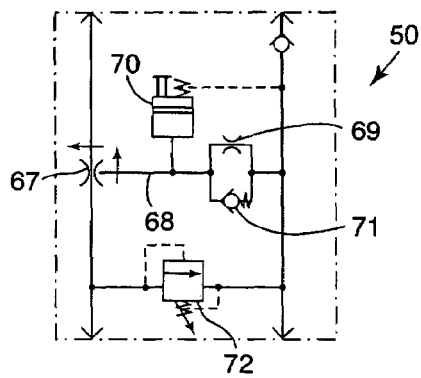
FIG. 3 is a schematic of an indicator valve assembly used in the circuitry of FIG. 2.

FIG. 2 shows the hydraulic circuitry 36 used to control the wrapping operation. The tailgate 22 is opened and closed by a single-acting hydraulic cylinder 38. The fork 27 of the transfer mechanism 26 is tilted by a double-acting hydraulic cylinder 39. The knives are raised and lowered by double-acting cylinders 40 and the wrapping table 30 is tilted by a pair of double-acting cylinders 41. The conveyor 34 of the wrapping table 30 is driven by a hydraulic motor 42 and the dispensers 32 are rotated around the bale 24 by a further hydraulic motor 43.

The circuitry 36 comprises a pair of connectors 45 for connecting the circuitry to an adjustable hydraulic power source on the towing vehicle, e.g. a tractor. Hydraulic power may be provided by a variable displacement pump 47, e.g. a pump having a movable swash plate, drawing oil from an oil tank 48. The pump may be driven either directly or indirectly by the engine of the vehicle. Alternatively, the pump may be a fixed-flow-rate pump which supplies pressurized oil via an adjustable flow divider, such that it is possible to vary the output rate of the tractor circuitry to the implement circuitry 36.

Oil from the pump 47 is fed to a valve assembly 49 and therefrom to the hydraulic actuators 38–41 via an indicator valve assembly 50 which will be described in further detail hereinafter. The valve assembly 49 comprises a pilot-controlled distributor valve 52 which receives the pressurized oil and splits the oil flow between a first service line 53 and a second service line 54. The first service line is provided with an electrically controlled, proportional control valve 56 which determines the oil flow rate to the conveyor motor 42 and therefrom to the dispenser motor 43. The serial connection between the two motors 42, 43 ensures a fixed relationship between the rotational speeds of the conveyor 34 and the dispensers 32, such that the wrapping material is disposed adequately over the full surface of the bale 24. The solenoid of the proportional valve 56 is connected to electrical control means which provide for a low speed at the start and at the end of the wrapping cycle and for a full speed in-between.

The action of the proportional valve 56 influences the pressure in the first service line 53 which, through a pilot, affects the position of the distributor valve 52 such that, at any time, the required oil flow is fed to the motors 42, 43. The remainder of the incoming oil flow is deviated to the second service line 54 to which are connected the electrically controlled valves 59, 60, 61 and 62 of the tailgate cylinder 38, the fork cylinder 39, the knife cylinders 40 and the table cylinders 41, respectively.

When no pressurized oil is needed for any of the cylinders 38–41, the control means opens a by-pass valve 64 which branches the second service line 54 directly onto a return line 65.

It is clear from the description above that the setting of the proportional valve 56 fully determines the amount of oil fed to the first service line 53. Hence, when the oil flow rate from the pump 47 is too low and the motors 42, 43 are turning, all available oil will be directed to this first line 53 and the second service line 54 will receive no or only an insufficient amount of oil. Such situation may occur at the end of the wrapping cycle, when the conveyor 34 and the dispensers 32 are driven and the knives have to be raised for cutting the tail of the wrapping material. If no sufficient oil flow is available, the cylinders 40 will not, or only too slowly raise the knifes into the path of the wrapping material.

The oil flow rate is even more critical shortly after the start of the wrapping cycle, when the dispensers 32 and the conveyor 34 are already working at full speed. At this stage the first wraps of sheet material are already secured against the bale by the following wraps, but the knives are still seizing the starting tails against the subframe 17. The knives have to be raised and lowered in order to release the tails of wrapping material before they start hampering the rotation of the bale. Initially, the revolution of the bale 24 stretches the tail only on one side of the wrapper 12. The knives have to be raised to release this stretched tail. Meanwhile the other tail keeps dangling between the bale 24 and the subframe 17. Only after half a revolution of the bale 24, also the other tail is stretched and then the knives have to be raised once more to release also the starting tail on this side. As the raised knives extend into the path of the dispensers 32, which are now rotated at full speed, there remains only a very short time interval for raising and lowering the knives. The knife cycle must take less time than half a revolution of the dispensers. A slow operation of the knife cylinders 40 because of insufficient oil flow will cause interference between the raised or half-raised knives and the dispensers 32.

Hence it is preferable for the operator to be able to verify that the tractor pump 47 is set to provide the adequate amount of oil to the implement 10. To this end, the circuitry 36 of the implement is provided with the indicator valve assembly 50. Herein, a flow divider 67 directs the full oil flow from the tractor pump 47 to the inlet port of valve assembly 49 as long as the oil flow rate remains below a predetermined value. When this value is exceeded, the divider 67 will limit the oil flow to the valve assembly 49 to this predetermined value and direct the remainder of the oil flow via a by-pass line 68 to the return line 65. The by-pass line 68 is provided with a restrictor 69, such that a pressure differential is created between the by-pass line and the return line. This differential is sensed at one side of a spring-loaded piston 70 which has at its outer end an indicator tab. The pressure pushes the piston outwardly such that the indicator tab becomes visible to an operator standing between the implement 10 and the tractor.

In order to limit the maximum pressure on the piston 70, the by-pass line 68 has, parallel to the orifice 69, a spring-loaded check valve. As a further safety measure, a pressure relief valve 72 is provided between the feed line, upstream the inlet port of the flow divider 67, and the return line 65. The flow divider 67, the restrictor 69, the piston 70, the check valve 71 and the pressure relief valve 72 may all be combined into a single valve assembly 50, which may be mounted to the control valve assembly 49.

When the operator connects the hydraulic circuitry 36 of the baler-wrapper combination 10 to the tractor, he now has the means of verifying whether the pump 47 is set to an adequate oil flow rate. After coupling the connectors 45, he engages the pump 47 and sets the flow rate to a low value. Meanwhile, no cylinders 38–41 or motors 42, 43 are activated. Consequently, the flow divider 67 will direct the full oil flow to the distributor valve 52 and therefrom to the second service line 54 and, via the by-pass valve 64 to the return line 65. Then the operator gradually increases the flow rate of the pump 47 while monitoring the flow indicator. When the flow rate reaches the predetermined value which corresponds to the minimum flow rate for adequate implement operation, the flow divider 67 will deviate part of the oil flow to the by-pass line 68 and the piston will be pushed outwardly. The indicator tab shows to the operator, who is thereby informed that he no longer needs to increase the flow rate. This setting provides for a proper operation of the hydraulic components, without an excess of oil flow which never would be used and which hence would be circulated needlessly through the system.

Although the apparatus and the method have been described with reference to a baler-wrapper combination, other embodiments of the invention can be thought of without departing from the scope of the invention as defined by the claims. For instance, the invention can be used for adjusting the oil flow to other towed or carried agricultural machinery, such as balers, wrappers, hay tedders, mowers, etc. In particular, the invention may prove useful where a single source of hydraulic power is used for a more or less continuously driven component and an intermittently used actuator. The constant flow to the driven component should not hamper the action of the actuator. For instance, there should be no interference between the rotation of a hay tedder rotor and the lifting action of the support arm of the rotor where repositioning is needed in order to adapt to changing field gradients.

The pressure indicator may also comprise an electrical switch which is actuated by the movement of the piston. The signal from the switch may then be used for lighting a warning light, e.g. in the vicinity of the flow rate controls, where the operator can readily see it. The signal may also be used as a feedback signal for adjusting the flow rate of the vehicle in an automatic control procedure.

We claim:

1. An agricultural-implement hydraulic circuit comprising:
   a pump supplying pressurized fluid to a first service line and a second service line via a feed line;
   means for varying the flow rate of said pump;
   a distributor valve disposed between the first service line and the second service line, the first service line and the second service line being connected and disconnected according to a position of said distributor valve;
   a hydraulic motor coupled to the first service line through said valve, said hydraulic motor discharging fluid to a return line;
   a hydraulic actuator coupled to the second service line; and
   an indicator-valve assembly coupled to the feed line, said indicator-valve assembly including an indicator sensitive to pressure in the feed line such that said indicator indicates a predetermined pressure in the feed line to an operator.

2. A hydraulic circuit according to claim 1, wherein said indicator-valve assembly further includes a flow divider including an inlet port connected to the feed line and an outlet port connected to said indicator.

3. A hydraulic circuit according to claim 2, wherein said flow divider prevents fluid flow to said outlet port as long as a predetermined flow rate has not been reached.

4. A hydraulic circuit according to claim 2, wherein said divider includes a flow restrictor.

5. A hydraulic circuit according to claim 4, further comprising a spring-loaded check valve arranged in parallel to said flow restrictor.

6. A hydraulic circuit according to claim 4, wherein at least said flow divider, said flow restrictor and said spring-loaded piston are arranged in a single valve assembly.

7. A hydraulic circuit according to claim 6, wherein said valve assembly further comprises a pressure relief valve connected to an inlet port.

8. A hydraulic circuit according to claim 1, wherein said indicator includes a spring-loaded piston.

9. A hydraulic circuit according to claim 8, wherein said indicator includes a visual indicator attached to said piston.

10. A hydraulic circuit according to claim 8, wherein said indicator includes means for generating an electrical signal or a digital message.

11. A hydraulic circuit according to claim 10, wherein said means for generating includes a connector for transmitting an electrical signal to said pump.

12. A method of providing hydraulic power to an agricultural implement including the hydraulic circuit of claim 1, said method comprising the steps of:
    monitoring the indicator; and
    adjusting the flow rate until the indicator indicates a flow rate equal to or greater than the predetermined flow rate.

13. A method according to claim 12, wherein the indicator is a visual indicator and said monitoring step comprises monitoring the visual indicator.

14. A method according to claim 12, wherein indicator generates an electrical signal and said monitoring step comprises monitoring an electrical signal generated by the indicator.

* * * * *